July 13, 1965 R. B. EDWARDS 3,193,877
MULTISTAGE EXTRUSION SCREW AND ALTERNATE FILTERS
Filed April 2, 1962
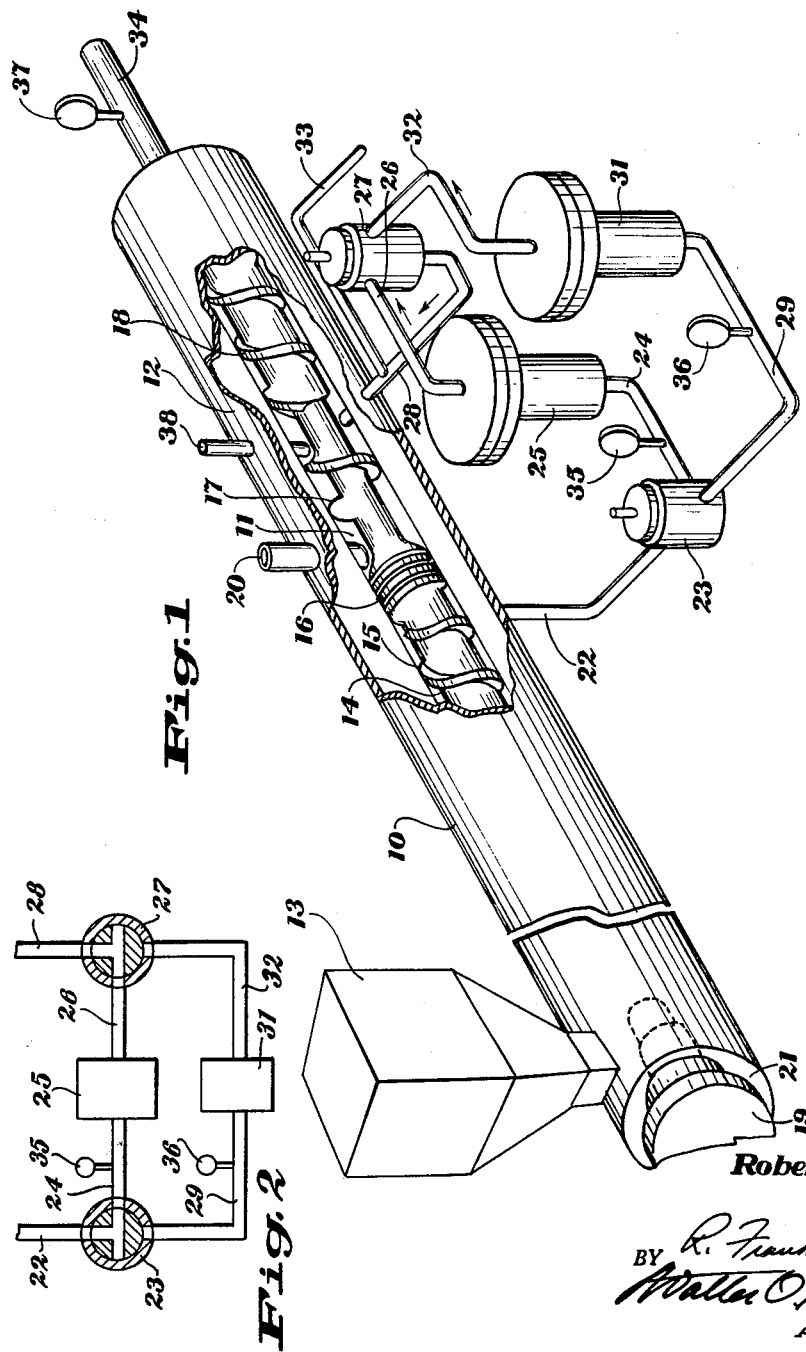
Robert B. Edwards
INVENTOR.
BY
ATTORNEYS

United States Patent Office 3,193,877
Patented July 13, 1965

3,193,877
MULTISTAGE EXTRUSION SCREW AND
ALTERNATE FILTERS
Robert B. Edwards, Rochester, N.Y., assignor to Eastman
Kodak Company, Rochester, N.Y., a corporation of
New Jersey
Filed Apr. 2, 1962, Ser. No. 184,386
4 Claims. (Cl. 18—12)

This invention relates to extrusion apparatus and more particularly to a multi-stage screw plasticizing extruder having an external bypass for conducting plastic from one part of the extrusion chamber to another. This extrusion apparatus is useful for continuously working, filtering and extruding thermoplastic compositions such as cellulose organic acid ester and polyester compositions.

An object of the present invention is to provide improved extrusion apparatus in which plastic compositions may be thoroughly mixed, undesirable gas present in the plastic composition evacuated therefrom, the composition filtered, additives introduced into and mixed with the filtered composition while still in the extruder and these operations accomplished while the extrusion apparatus is in continuous operation.

Another object of this invention is to provide extrusion apparatus having several extrusion stages with an external bypass connecting the two separate portions of the extrusion chamber for conducting the composition from the first to the third stage of the extrusion process.

Another object of the invention is to provide in the external bypass one or more transfer valves, one or more filters and means for introducing additives to the filtered composition being extruded.

Other objects will appear hereinafter.

In accordance with the present invention, these and other objects are attained by employing an extrusion device in which an extrusion screw having four different screw flights thereon is provided. The initial stage is the plasticizing and/or metering stage which conducts thermoplastic material, as in comminuted form, from a hopper into the extruder where it is heated to become thermoplastic. While the feed material is often in pellet, granular, ribbon or strip form, it could be introduced in the form of a fluid. The second stage of the screw is a flow restriction stage which prevents the thermoplastic material from continuing along the extrusion chamber. The third or extraction stage has screw flights deep enough so that the screw runs only partially filled and this permits the release of occluded gas or moisture which may be present in the thermoplastic composition and this gas or moisture is extracted from the extrusion chamber. The fourth stage of the screw is the pumping stage which forces the completely mixed and de-gasified thermoplastic out of the extruder and into any following process step which is carried on by apparatus and fluid communication therewith. Since the second stage of the extruder screw prevents continuous flow of the plastic material along the extrusion chamber, a bypass is provided which connects the extrusion chamber in advance of the second stage to the extrusion chamber adjacent the third stage of the screw. In this bypass, there is provided a transfer or switching valve connected to two conduits in parallel, which two conduits also are connected to a second transfer valve from which the bypass leads to the extrusion chamber adjacent the third stage of extrusion. Each of these conduits is provided with a filter. Generally, only one conduit and filter is employed at a time, though both may be used simultaneously. When one filter becomes clogged with the material thus filtered from the thermoplastic, the transfer valve closes this conduit and directs the thermoplastic to the second conduit where it passes through the unobstructed filter and thence into the extrusion chamber. This permits the operator to clean the first filter and this alternate use and cleaning of the filters permits continuous operation of the device. Additional conduits are provided which are in fluid communication with the extrusion chamber adjacent the third stage so that additives can be introduced into the thermoplastic material and mixed therein prior to the extrusion of the thermoplastic from the extruder.

The present invention is further described in the following detailed description with reference to the accompanying drawings in which:

FIG. 1 is a schematic view, with portions broken away, showing the extruder, the extrusion screw and the bypass and its associated valves and filtering equipment.

FIG. 2 depicts the operation of the three-way valves for directing thermoplastic through the alternate filters which are positioned in the conduits, in parallel, in the bypass.

Referring to FIG. 1, the extrusion apparatus comprises an extrusion cylinder 10 having an extrusion passage 11 therein and a heating chamber 12 surrounding passage 11. Heating fluid is conducted through heating chamber 12 by conventional means, not shown, to raise the temperature of the composition being extruded to a desired degree of plasticity. A hopper 13 is provided through which the composition to be extruded may be introduced into the extrusion chamber.

The extrusion screw 14, which is positioned in passage 11, comprises a first stage 15, a second stage 16, a third stage 17, a fourth stage 18. The screw 14 may be rotated by pulley means 19 extending through the end wall 21 of cylinder 10 or any other conventional means.

The first stage 15 of the screw is the plasticizing and/or metering stage which consists of a feed, compression and metering section of the extruder.

The second stage 16 of the screw is the flow restriction stage which consists of a length of the screw in which the pitch of the flights is reversed to that of the other stages. The second stage 16 therefore pumps in direct opposition to the first stage and thereby acts as a restriction to prevent the flow of the thermoplastic along the extruder.

Thus, the second stage 16 of the screw causes the thermoplastic to flow into external bypass 22. In this bypass 22 is positioned a transfer valve 23 which may direct the thermoplastic either through pipe 24, filter 25, pipe 26, transfer valve 27 and pipe 28 and thence back into the extruder chamber 11 or if filter 25 has become clogged from prolonged operation, valve 23 will operate to direct the thermoplastic through pipe 29, filter 31, pipe 32, valve 27, pipe 28 to chamber 11. Filter 25, therefore, can be cleaned and restored to operative condition without disturbing the continued operation of the extrusion apparatus. Conversely, when filter 31 becomes clogged, valve 23 will operate to direct the thermoplastic to filter 25, whereupon filter 31 may be similarly cleaned.

Referring to FIG. 2, it will be apparent that the thermoplastic flowing through conduit 22 will pass from extruder 10 through valve 23, conduit 24, filter 25, conduit 26, valve 27, conduit 28 back to extruder 10. When filter 25 becomes clogged, the valves 23 and 27 will turn to direct the thermoplastic through conduit 29, filter 31, conduit 32, valve 27, conduit 28 to extruder 10. This permits filter 25 to be cleaned without interruption of the process. When filter 31 is clogged, the valves then return to the position shown in FIG. 2.

The transfer valves can be manually operated or automatically operated by conventional means which are actuated by a pressure build-up in the respective filters.

Pigments, dyes or other addenda may be introduced into the now filtered thermoplastic in pipe 28 through feed pipe 33 or else through feed pipe 38, by suitable means, not shown.

The thermoplastic now comes in contact with the third stage of the screw 17 having screw flights sufficiently deep so that the screw runs only partially filled. This permits release of occluded gas or moisture which may be present in the thermoplastic and this can be vented from the extruder chamber 11 by means of vacuum line 20 which is suitably connected to a vacuum pump, not shown.

The thermoplastic is then carried along to the fourth and final screw stage 18 which is the pumping stage. The screw flights in this pumping stage are shallower than those in the previous screw stage 17 so that the thermoplastic becomes recompressed and sufficient pressure is developed to pump the thermoplastic through exit pump 34 and to whatever other equipment, not shown, may be attached thereto in fluid communication. Such additional equipment may include additional filters, extrusion dies and so on. Pressure gauges 35, 36 and 37 are shown respectively in fluid communication with conduits 24, 29 and 34 to give visual readings of the pressure on the thermoplastic flowing through these conduits.

Thermocouples, not shown, may be suitably positioned along the extruder to indicate temperature conditions.

The thermoplastic being extruded may be cellulose acetate, a polyester, a polyolefin such as polyethylene or polypropylene.

The invention has been described in detail with particular reference to preferred embodiments thereof, but it will be understood that variations and modifications can be effected within the spirit and scope of the invention as described hereinabove and as defined in the appended claims.

I claim:

1. Apparatus for extruding and mixing thermoplastic compositions comprising a heated extrusion cylinder, a multi-stage extrusion screw positioned therein, means for rotating said screw, said screw having a plasticizing and metering stage, a flow restriction stage, a gas releasing stage, a pumping stage, a first conduit in fluid communication with the extrusion cylinder adjacent said first mentioned screw stage and having a first transfer valve therein, a second conduit in fluid communication with the extrusion cylinder adjacent said third mentioned screw stage and having a second transfer valve therein, a pair of conduits in parallel connecting said first transfer valve to said second transfer valve, a filter in each of said pair of conduits in parallel, said transfer valves being adjustable to select a path of flow for the thermoplastic material through either of said pair of conduits in parallel.

2. Apparatus for extruding and mixing thermoplastic compositions comprising a heated extrusion cylinder, a multi-stage extrusion screw positioned therein, means for rotating said screw, said screw having (1) a plasticizing and metering stage, (2) a flow restriction stage in which the pitch of the flights is reversed to that of said other stages, (3) a gas releasing stage having relatively deep screw flights along which occluded gas or moisture in the gas can be released, (4) a pumping stage which serves to pump the thermoplastic out of the extruder, a first conduit in fluid communication with the extrusion cylinder adjacent said first mentioned screw stage and having a first transfer valve therein, a second conduit in fluid communication with the extrusion cylinder adjacent said third mentioned screw stage and having a second transfer valve therein, a pair of conduits in parallel connecting said first transfer valve to said second transfer valve, a filter in each of said conduits in parallel, said transfer valves adapted to select a path of flow for the thermoplastic material through whichever of said pair of conduits in parallel presents a predetermined resistance to flow, and conduit means leading to said third stage adapted to introduce additives to the thermoplastic composition being extruded.

3. Apparatus for extruding and mixing thermoplastic compositions comprising a heated extrusion cylinder, a multi-stage extrusion screw positioned therein, means for rotating said screw, said screw having (1) a plasticizing and metering stage, (2) a flow restriction stage in which the pitch of the flights is reversed to that of said other stages, (3) a gas releasing stage having relatively deep screw flights along which occluded gas or moisture in the gas can be released, (4) a pumping stage which serves to pump the thermoplastic out of the extruder, a first conduit in fluid communication with the extrusion cylinder adjacent said first mentioned screw stage and having a first pressure actuated valve therein, a second conduit in fluid communication with the extrusion cylinder adjacent said third mentioned screw stage and having a second pressure actuated valve therein, a pair of conduits in parallel connecting said first pressure actuated valve to said second pressure actuated valve, a filter in each of said conduits in parallel, said first and second pressure actuated valves adapted to select a path of flow for the thermoplastic material through whichever of said pair of conduits in parallel presents a predetermined resistance to flow, and conduit means in fluid communication with said second conduit leading to said third stage adapted to introduce additives to the thermoplastic composition being extruded.

4. Apparatus for extruding and mixing thermoplastic compositions comprising a heated extrusion cylinder, a multi-stage extrusion screw positioned therein, means for rotating said screw, said screw having (1) a plasticizing and metering stage, (2) a flow restriction stage in which the pitch of the flights is reversed to that of said other stages, (3) a gas releasing stage having relatively deep screw flights along which occluded gas or moisture in the gas can be released, (4) a pumping stage which serves to pump the thermoplastic out of the extruder, a first conduit in fluid communication with the extrusion cylinder adjacent said first mentioned screw stage and having a first pressure actuated valve therein, a second conduit in fluid communication with the extrusion cylinder adjacent said third mentioned screw stage and having a second pressure actuated valve therein, a pair of conduits in parallel connecting said first pressure actuated valve to said second pressure actuated valve, a filter in each of said conduits in parallel, said first and second pressure actuated valves adapted to select a path of flow for the thermoplastic material through whichever of said pair of conduits in parallel presents a predetermined resistance to flow, and conduit means in direct fluid communication with said extrusion chamber adjacent to said third stage and adapted to introduce additives to the thermoplastic composition being extruded.

References Cited by the Examiner
UNITED STATES PATENTS

| | | | |
|---|---|---|---|
| 2,183,577 | 12/39 | McNeal | 210—108 XR |
| 2,441,526 | 5/48 | Zollinger | 210—108 |
| 2,679,320 | 5/54 | Walton | 210—340 |
| 2,836,851 | 6/58 | Holt | 18—30 |
| 3,033,256 | 5/62 | Schrenk | 18—12 |
| 3,059,276 | 10/62 | Yokana | 18—12 |

WILLIAM J. STEPHENSON, *Primary Examiner.*

MICHAEL V. BRINDISI, *Examiner.*